United States Patent [19]

Wood

[11] 4,351,663
[45] Sep. 28, 1982

[54] GLASS CONTAINER REJECTOR
[75] Inventor: Charles L. Wood, Muncie, Ind.
[73] Assignee: Ball Corporation, Muncie, Ind.
[21] Appl. No.: 242,413
[22] Filed: Mar. 10, 1981

Related U.S. Application Data

[63] Continuation-in-part of Ser. No. 116,969, Jan. 30, 1980, abandoned.

[51] Int. Cl.³ .......................... C03B 9/44; C03B 35/12
[52] U.S. Cl. ............................................ 65/66; 65/111; 65/160; 65/165; 65/260; 414/730; 414/734
[58] Field of Search ...................... 65/66, 68, 111, 160, 65/165, 260; 414/730, 733, 734

[56] References Cited
U.S. PATENT DOCUMENTS

| | | | |
|---|---|---|---|
| 1,878,156 | 9/1932 | Lorenz | 414/733 X |
| 1,921,393 | 8/1933 | Lorenz | 65/260 |
| 3,767,374 | 10/1973 | Iacovazzi et al. | 65/165 |
| 4,152,134 | 5/1979 | Dowling et al. | 65/158 X |

Primary Examiner—Arthur D. Kellogg

[57] ABSTRACT

A dual-mode takeout mechanism is provided for use in, for example, an individual section glassware forming machine. In the normal mode of operation, the formed ware is transported in a fixed radius vertical arc from a molding station to a cooling station and released for further processing. In the reject mode of operation, defective formed ware is transported in an enlarging vertical arc from the molding station to a disposal station. An arm of the takeout mechanism is capable of extending in telescoping fashion, and is activated in the reject mode so as to begin the extension process as the takeout mechanism begins to transport ware from the molding station. A controller is provided to detect when the reject mode has been commanded. The reject mode can be entered for a desired number of cycles by computer command, sensor command, or operator command (manual entry). If the reject mode has been entered, the controller operates a solenoid controlled valve which extends the arm pneumatically.

27 Claims, 12 Drawing Figures

FIG. 1B (PRIOR ART) (IN-AIR CHECK VALVE)

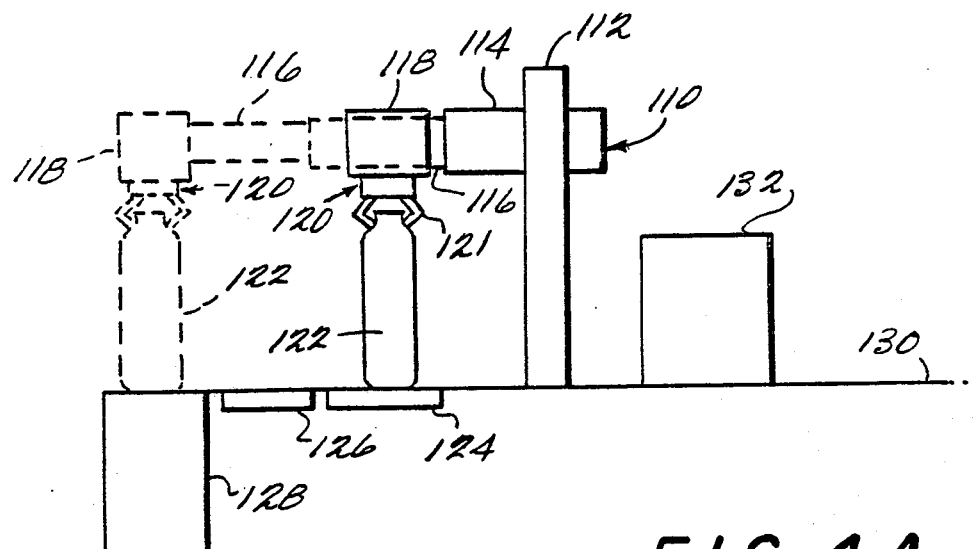
FIG. 4A
FIG. 4B
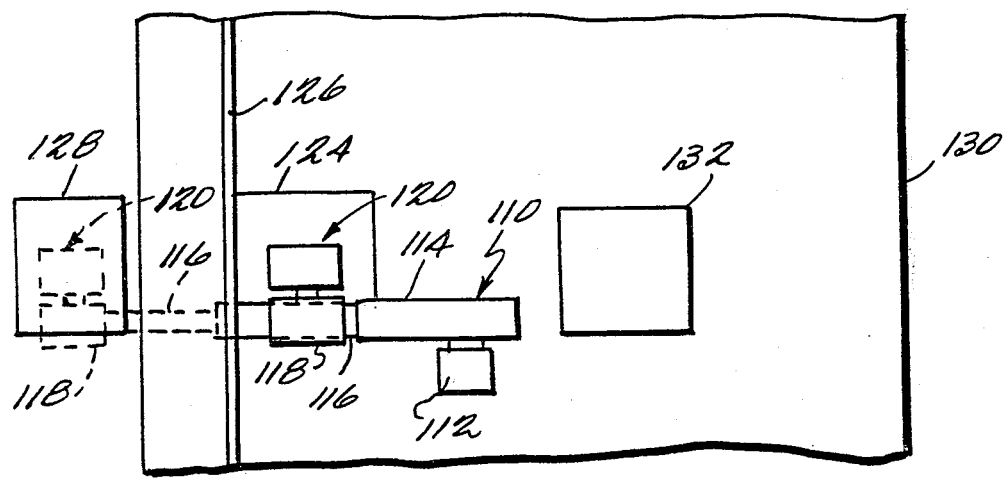

GLASS CONTAINER REJECTOR

BACKGROUND OF THE PRESENT INVENTION

This application is a continuation-in-part of my earlier co-pending application Ser. No. 116,969 filed Jan. 30, 1980 now abandoned.

This invention relates to a unique takeout mechanism for a ware forming machine which automatically under operator control or under computer control disposes of defective ware before the defective ware is placed in the product stream. Specifically, this invention relates to a uniquely modified takeout mechanism for an individual section glass machine which is automatically extendable to transport defective ware from a molding station directly to a disposal mechanism.

Programmed manipulator apparatus are known outside of the glassware-forming art. They are not suitable for use with ware forming machines, such as for example the glassware forming machine disclosed in U.S. Pat. No. 1,911,119 (Ingle, May 23, 1933), because of their cost, complexity, maintenance requirements, and space requirements. Such apparatus are disclosed in U.S. Pat. No. 3,543,910 (Devol, Dec. 1, 1970) and U.S. Pat. No. 3,661,051 (Dunne et al., May 9, 1972).

Known ware forming machinery is not adapted to reject defective glassware during the initial ware cooling period. Operating only to transfer glassware from a molding station to a cooling station, known takeout arms operate on the principal of linear transport, as disclosed in U.S. Pat. No. 3,650,725 (Okumura et al., Mar. 21, 1972), or semicircular fixed radius transport, as discussed below.

A semicircular fixed radius takeout mechanism known in the prior art is shown in FIGS. 1, 2 and 3. The takeout mechanism is operated pneumatically through a valve block (not shown) controlled by a timing mechanism (not shown). The takeout mechanism includes tongs (not shown) which grasp the ware under the finish in order to transport it. When the takeout mechanism is in a quiescent state (no air pressure applied), the tongs are positioned over the cooling station and elevated above the finish of the ware so that movement of the transferred ware from the cooling station will not be interfered with. When compressed air is applied, the takeout tongs swing in a fixed radius vertical arc to the molding station, which contains freshly molded ware. The takeout mechanism is now in its "takeout-in" position, meaning that the takeout arm has moved into the ware-forming area of the individual section glass machine. The tongs then close, grasping the ware under the finish, and swing 180° in a fixed radius vertical arc to bring the ware over the cooling station. The takeout mechanism is now in its "takeout-out" position, meaning that the takeout arm has moved out of the ware-forming area of the individual section glass machine. When air pressure is released, the tongs open and are elevated above the finish of the ware. The takeout mechanism is again in a quiescent state, as described above.

The operation of the prior art takeout mechanism is now discussed in more detail. A takeout mechanism actuator 10 is shown in FIG. 1A. The actuator 10 is fixed to, for example, a glassware forming machine and functions to move a takeout arm 50 (FIG. 2) in a fixed radius vertical arc. A tong head 70 engages arm 50 along axis B, as shown in FIGS. 2 and 3. In turn, the arm 50 engages the actuator 10 along axis A, as shown in FIGS. 1 and 2. Beginning with the tong head 70 positioned over the cooling station and elevated above the finish of the ware, actuator 10 is in a quiescent state with no air pressure being applied. When it is desired to transport ware from the molding station, compressed air is applied to actuator 10 through in-air check valve 12 and in-air inlet 13, as shown in FIG. 1B (FIG. 1B is rotated 180° with respect to FIG. 1A, as indicated by the relative position of a cushion plug 11). The compressed air passes into a lower cylinder 14 and pushes down a lower cylinder piston 16 which connects to piston rod 18. The upper part of piston rod 18 is a toothed rack 20 which engages gear 58 of the arm 50 (FIG. 2) in order to rotate the arm 50 in a vertical arc about axis A (clockwise as viewed from FIG. 1A). The air below lower cylinder piston 16 is thereby forced out of an in-air exhaust 22 and acts to cushion the lower cylinder piston 16 on the "in" stroke. The takeout mechanism is now in a "takeout-in" state; the tongs are positioned over the ware and will engage the ware under the finish when closed. Compressed air now is applied to the actuator 10 through out-air lower pipeing 24 to cause three events to occur in sequence.

The first event occurs when the compressed air reaches upper cylinder 26, thereby raising an upper cylinder piston 28, compressing an upper cylinder spring 30, and enabling the toothed rack 20 and piston rod 18 to rise to their full height.

The second event occurs when compressed air, passing into the out-air passageway 56 through an out-air passageway 52 provided in shaft 54, enters into an out-air inlet/exhaust 74 in tong head 70. Passing through the out-air passageway 76, the compressed air enters cylinder 78. The compressed air forces a piston 80 in a downward direction, thereby compressing spring 86 by means of piston rod 82 and a washer 84, and closing tong holders 90 by means of link 88. Tongs (not shown) connected to the tong holders 90 grasp the ware under the finish and securely hold it for transport.

The third event occurs when compressed air enters into lower cylinder 14 through out-air inlet 32. The compressed air passes through an out-air check valve 34 into the lower cylinder 14 and forces the lower cylinder piston 16 in an upward direction. The toothed rack 20 is moved in an upward direction by the piston rod 18 and engages gear 58 of the arm 50, thereby transporting the ware from the molding station to the cooling station in a fixed radius vertical arc.

The takeout mechanism is now in a takeout-out state; the ware is positioned over the cooling station. Air pressure inside the actuator 10 is then released, causing two additional events to occur. The first event occurs when air pressure in cylinder 78 is reduced and spring 86 forces piston rod 82 in an upward direction, thereby opening tong holders 90 and releasing the ware. The next event occurs when air pressure in cylinder 26 is reduced, thereby permitting spring 30 to force plunger 36 against the top of the toothed rack 20, thereby causing the tongs to be elevated above the finish of the ware in the cooling station. The actuator 10 is now in its quiescent state.

The prior art takeout mechanism swings the ware from the molding station to the cooling station in a fixed radius vertical arc, maintaining the axis of the ware in a vertical plane. As discussed above, gear 58 directly drives arm 50 which rotates about shaft 54 which is, in turn, securely fixed to the actuator 10. Since fixed gear 60 is securely fixed to shaft 54, drive gear 64 (rotatably mounted inside of arm 50 and communicating with fixed gear 60 through chain 62) drives arm 50 in a vertical arc via gear 58. Fixed gear 60, in effect, drives chain 62 which rotates drive gear 64 at precisely the same rotational speed as the arm 50, but in an opposite direction. Tong head 70 securely engages drive gear 64 by means of shaft 72 along the axis B, and therefore has the same rotational speed as the arm 50 but an opposite rotational direction. As a result, tong head 70 maintains the axis of the ware in a vertical plane.

While the prior art fixed radius arc takeout mechanism is suitable for use in, for example, the glassware forming machine of U.S. Pat. No. 1,911,119 (Ingle, May 23, 1933) and equivalent apparatus, it is not suitable for being automatically actuated to reject defective ware before the defective ware passes into the product stream.

SUMMARY OF THE PRESENT INVENTION

The preferred embodiment of the present invention not only overcomes the disadvantages mentioned above for the known takeout mechanisms, but also provides a fast way to reject defective glassware before the defective ware can enter into the product stream.

The present invention not only permits one to dispose of defective ware before it enters the product stream, but also increases the speed by which defective ware may be disposed of, thereby allowing a shorter machine cycle time. In the preferred embodiment, a controller keeps a count indicative of the number of pieces of ware to be disposed. Disposal of defective ware is automatic in response to an operator's signal, a computer command, or a defect sensor command. Yet the exemplary ware rejector is of little complexity, requires modest construction cost and little maintenance, and occupies an extremely small horizontal area.

The takeout mechanism of the preferred embodiment includes an arm pivotally mounted to a takeout mechanism actuator that rotates the arm. The arm includes a tong head coupler which engages a tong head for the purpose of grasping and transporting ware. In the normal mode of operation, the ware from the molding station is transported in a fixed radius vertical arc to the cooling station and released for further processing. In the reject mode, however, the defective ware from the molding station is transported in an enlarging vertical arc to a disposal station, thereby being rejected before passing into the product stream. In the preferred embodiment, the arm of the takeout mechanism is capable of extending in telescoping sections, and is activated so as to begin the extension process as the takeout mechanism begins to transport the defective ware from the molding station. Once over the disposal station, the defective ware is released.

The reject mode can be entered into either automatically or at the command of an operator. A logical circuit is provided in order to detect whether the reject mode has been commanded. If the reject mode has been entered, a solenoid controlled valve enables the arm to be extended pneumatically in the preferred embodiment.

Other objects, features and advantages of the present invention will become more fully apparent from the following detailed description of the various embodiments, the appended claims, and the accompanying drawings.

BRIEF DESCRIPTION OF THE DRAWINGS

In the drawings, where like numbers indicate like parts,

FIGS. 1A, 1B, 2 and 3 are detailed drawings of a prior art fixed radius arc takeout mechanism;

FIGS. 4A, 4B and 4C are exemplary schematic drawings of the takeout mechanism according to the present invention;

DETAILED DESCRIPTION OF THE PREFERRED EMBODIMENT

Figure 2:
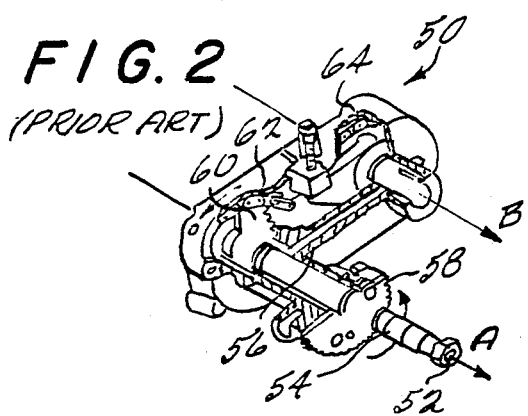
Figure 3:
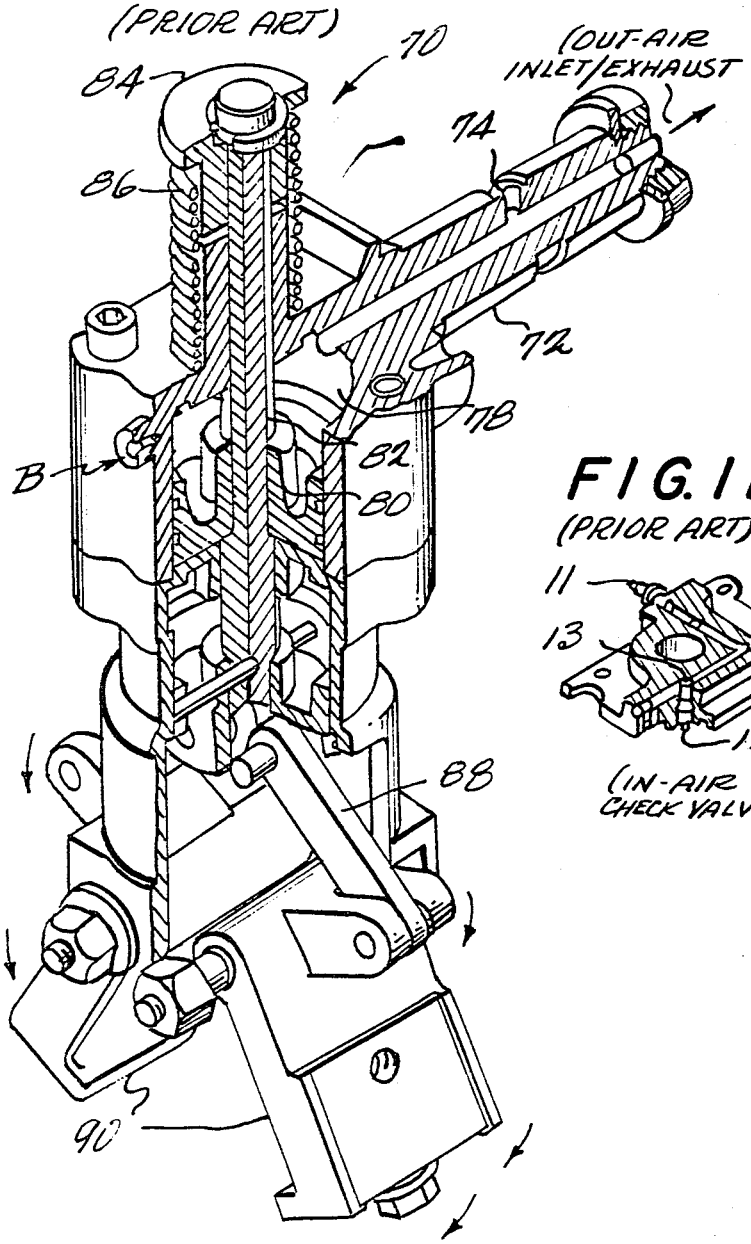
Figure 1A:
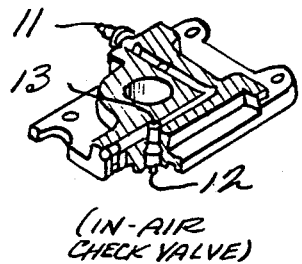
Figure 1A:
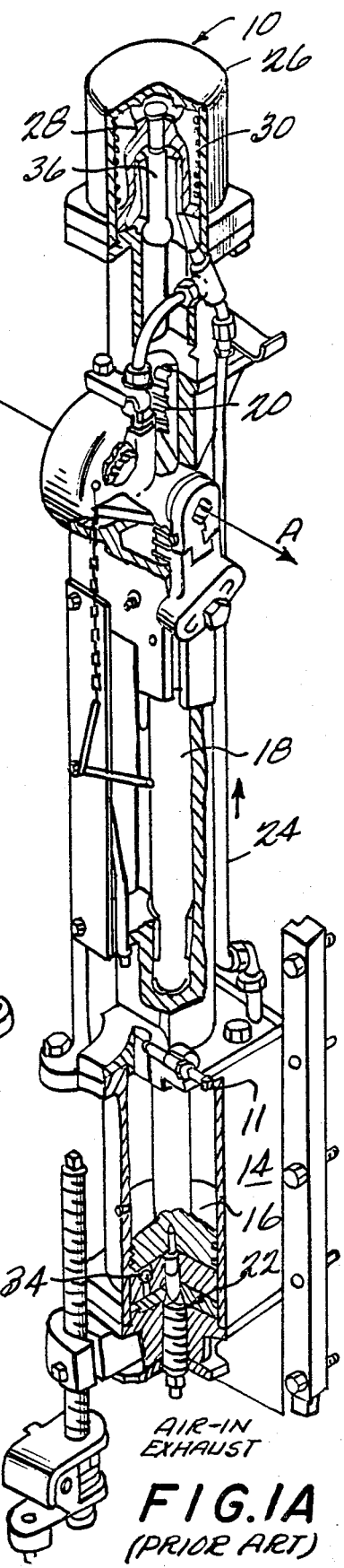
Figure 4C:
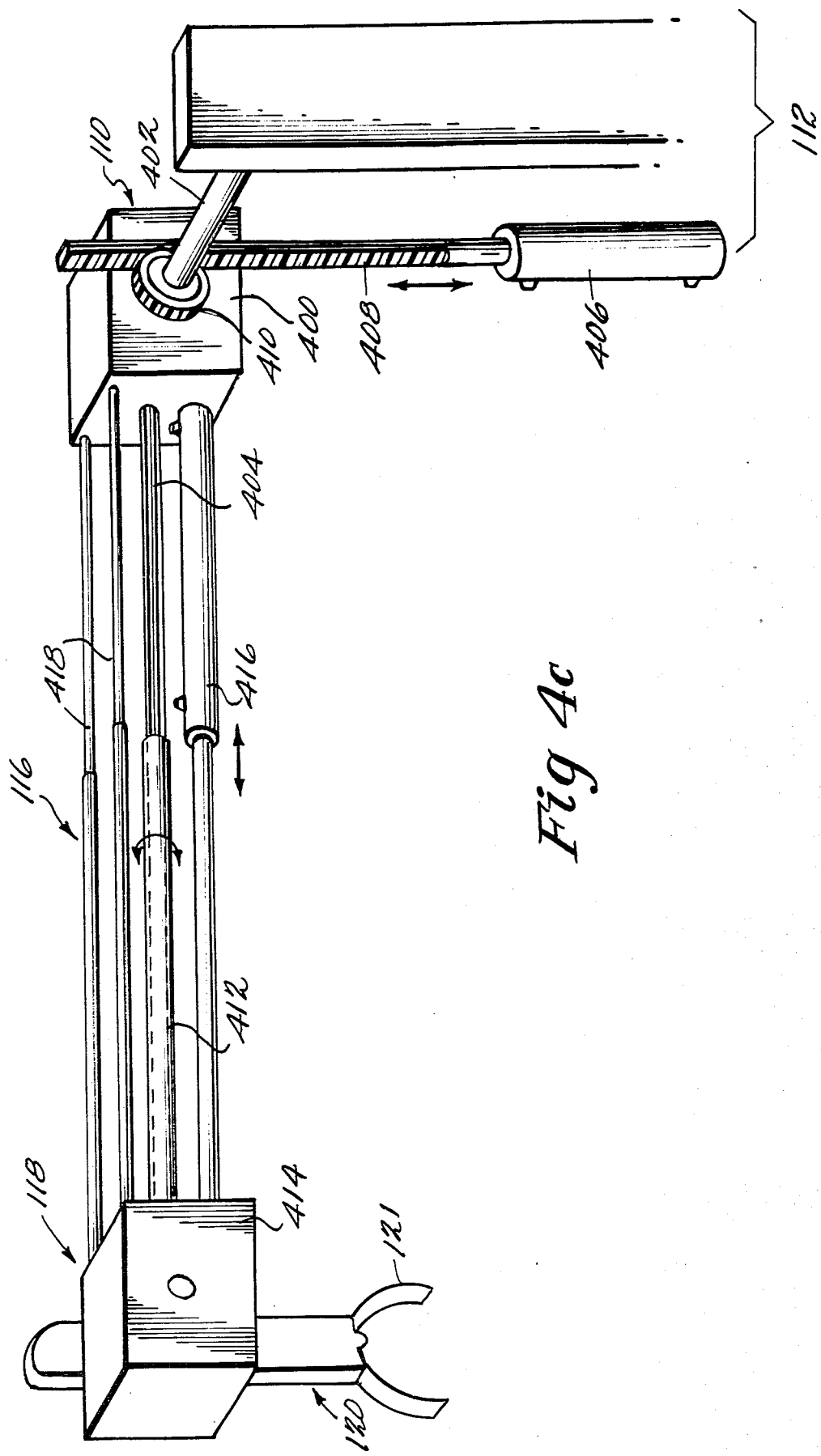
Figure 5A:
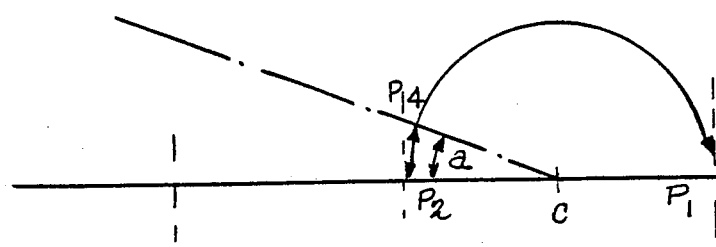
FIGS. 5A, 5B and 5C are curves depicting the motion and the various rest states of the takeout mechanism according to the present invention.
Figure 5B:
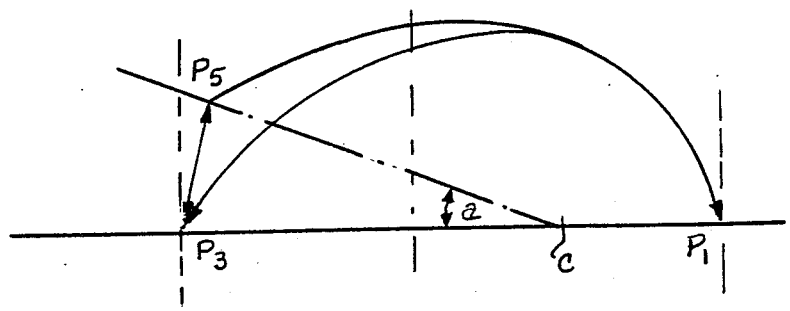
Figure 5C:
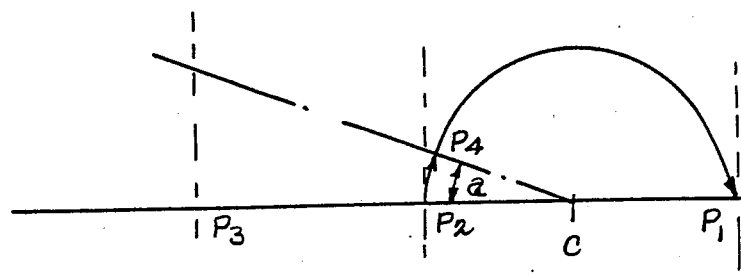

The preferred embodiment will be described with reference to FIG. 4A, showing a side view, FIG. 4B, showing a top view, and FIGS. 5A, 5B and 5C showing the motion and the various rest states of the preferred embodiment. An actuator 112 is secured to an individual section of an individual section (IS) glass machine, represented herein by machine surface 130.

When actuator 112 is in a quiescent state (no air pressure being applied) a takeout arm 110, which is pivotally mounted via section 114 to the actuator 112, is slightly elevated by an angle "a" relative to the horizontal and is at a position $P_4$ as indicated in FIG. 5A. When it is desired to remove a piece of ware from a blow mold 132 (molding station of an IS glass machine), which is secured to machine surface 130, the takeout-in state is entered by applying a takeout-in signal to a valve block (not shown), causing compressed in-air to enter actuator 112 through an in-air port (not shown). The arm 110 is moved from $P_4$ to a point $P_1$ above blow mold 132 along a vertical arc as shown in FIG. 5A. A tong head coupler 118 connects tong head 120 to telescoping sections 116 of arm 110, and includes tongs 121 for grasping ware 122. When it is desired to enter the takeout-out state in order to remove the ware from the blow mold 132, a takeout-out signal is applied to a valve block (not shown), causing compressed out-air to enter actuator 112 through an out-air port (not shown). At this point the arm 110 will be in either a normal mode or a reject mode. Presuming that the arm 110 is in the normal mode, actuator 112 will, upon receiving the compressed out-air, cause tongs 121 to close on ware 122, and swing ware 122 in a vertical full fixed radius half circle to point $P_2$ as shown in FIG. 5A. $P_2$ indicates a point above a dead plate 124 (cooling station of an IS machine). When the takeout-out signal is removed, air pressure is relieved in the actuator 112, tongs 121 will open to release ware 122, and the arm 110 will return to its quiescent position at point $P_4$. If the arm 110 is in a reject mode, compressed out-air applied to the actuator 112 will cause the arm 110 to begin to move in an arc away from point $P_1$, as above. Compressed air simultaneously applied to an actuator for the telescoping sections 116, however, will cause sections 116 to extend, thereby moving arm 110 in an enlarging vertical arc from point $P_1$ to point $P_3$ as shown in FIG. 5B. $P_3$ indicates a point above a disposed mechanism 128. When the takeout-out signal is removed, air pressure is relieved in the actuator 112 and arm 110 moves to point $P_5$. Although actuator 112 is in a quiescent state, the section 116 remains extended under pressure and will not retract until a takeout-in state is received. When a takeout-in signal is received, the arm 110 moves in a path from point $P_5$ to point $P_1$. As discussed above, a takeout-out signal must be received before the arm 110 will again move. Its path of motion depends upon whether the control is in a normal mode or a reject mode. If in a normal mode, arm 110 moves along the path from point $P_1$ to point $P_2$ as described above. If in the reject mode, the arm 110 moves along the path from point $P_1$ to point $P_3$ as discussed above.

It is understood that the above paths of motion are not the exclusive paths but are offered only by way of illustration. For example, arm 110 movement during the takeout-out state may be along path $P_1$ to $P_2$ to $P_3$, during the quiescent state along path $P_3$ to $P_2$ to $P_4$, and during the takeout-in state along path $P_4$ to $P_1$ as shown in FIG. 5C.

Although the preferred embodiment of FIGS. 4A and 4B show a telescoping arm 116, such telescoping apparatus being well known in the art, it is to be understood that other embodiments, such as a rack and gear mechanism and a lazy tong mechanism (a series of jointed bars crossing each other) which are well known in the art, are included within the scope of the present invention.

One exemplary embodiment of the telescoping takeout arm 110 is shown in FIG. 4C. Here, a first rightangle gearbox 400 having a one-to-one drive ratio (other complementary gear ratios may be used as long as the overall relationship is a one to one ratio for the two gear boxs linked together) between input shaft 402 and output shaft 404 is pivotally mounted by its drive shaft 402. A pneumatic air cylinder 406 drives a rack 408 meshed with gears 410 that are attached to the gearbox 400 itself. This driving arrangement is generally similar to the drive mechanism used for existing takeout mechanisms on individual section glassware forming machinery.

The output shaft 404 of the first gearbox 404 is splined and slidably connected to a splined input drive shaft 412 of a second right-angle gear drive 414 also having a one-to-one drive ratio. The output shaft of the second gearbox drives the tong head 120 with its traditional tongs 121. Pneumatic cylinder 416 is also provided so as to vary the distance upon command between the two gearboxes 400 and 414. In addition, for mechanical rigidity, slidable members 418 maybe provided to maintain relative angular orientation between the gearboxes constant.

In operation, the extendable arm 110 shown in FIG. 4C maintains the tongs 121 in a vertical orientation as the arm is rotated through 180° by the air cylinder 406 which vertically drives the toothed rack 408. For normal operations, the air cylinder 416 would be retracted so that normal glassware is transferred from the glassware forming-machine to the normal glassware manufacturing process line. However, in response to a reject command, the air cylinder 416 would be extended during the 180° rotation of the arm 110 so that defective glassware is transferred to a reject location rather than the normal glassware manufacturing process line. Other mechanisms for interconnecting the extendable arm 110 and for maintaining synchronous rotation between shafts at either end of the arm will be apparent to those skilled in the art.

As indicated above, the arm 110 will arrive at point $P_2$ in the normal mode and at point $P_3$ in the reject mode when actuator 112 is in the takeout-out state. If in the normal mode, the arm 110 will move along path $P_2$ to $P_4$ (FIG. 5A) when actuator 112 goes into the quiescent state, and the ware will be left behind on dead plate 124. FIGS. 4A and 4B show the arm 110 as it would be positioned in the normal mode during the takeout-out state just prior to entering the quiescent state. If in the reject mode, however, the arm 110 will move along path $P_3$ to $P_5$ (FIG. 5B) when actuator 112 goes into the quiescent state, and the ware will be released into the disposed mechanism 128. FIGS. 4A and 4B show in phantom the arm 110, tong head 120, and ware 122 as they would be positioned in the reject mode just prior to entering the quiescent state.

In the preferred embodiment, operation of the actuator 112 is achieved by compressed air in accordance with techniques well known in the art (see for example the cylinder-piston mechanism as described in U.S. Pat. No. 1,911,119, (Ingle, May 23, 1933), which is incorporated herein by reference thereto). The extension of sections 116 may be achieved by pneumatic means under the control of a controller 148 of FIG. 6. An optical isolator 154 couples reject signals from reject controller 150 to reject signal processor 156. The reject controller 150 may be a normally open push-button switch with one lead connected to a source of voltage and another lead connected to the optical isolator 154. Alternatively, the reject controller may be a computer which is capable of generating reject pulses when certain predetermined conditions arise (e.g., the start-up of an IS glass machine section). Alternatively, the reject controller may be a sensor capable of sensing defects in the ware 122 and generating a pulse for each defective piece of ware 122. Optical isolator 154 is provided to isolate the noise-sensitive processor 156 from the high noise environment to which the reject controller 150 may be exposed. Such optical isolators are well known in the art. Upon receipt of a reject pulse, an accumulator (FIG. 7) included within processor 156 is incremented by one, indicating that an additional reject operation must be performed. At predetermined times in the operation of the IS glass machine section, a takeout-in signal is generated by the machine timing controller 152 and applied to the processor 156 through optical isolator 154. If the count of reject pulses in processor 156 is zero, no activation signal will be produced at the output of the processor 156. A driver 158 connects processor 156 to a solenoid controlled valve 160. Receiving no activation signal from processor 156, driver 158 will not activate valve 160. Therefore, the arm 110 is in the normal mode. If there is a positive count in processor 156, however, then an activation signal will appear at the output of processor 156 and applied to the driver 158. The driver 158 will activate the valve 160 in order to permit compressed air from pneumatic driver 162 to be applied to the arm 110 in order to extend sections 116. The arm 110 is in the reject mode. It is to be understood that the takeout-out signal simultaneously causes compressed air to operate actuator 112, and the rates of pressurization in the arm 110 and the actuator 112 are coordinated so as to cause the arm 110 to follow the path $P_1$ to $P_3$ of FIG. 5B. When the takeout-out signal turns OFF, actuator 112 enters the quiescent state. Tongs 121 open and release ware 122 into disposal mechanism 128, and the arm 110 follows path $P_3$ to $P_5$ (FIG. 5B). The valve 160, unresponsive to the turnoff of the takeout-out signal, remains activated. When the machine timing controller 152 generates a takeout-in signal, it is applied to processor 156 through optical isolator 154. The sum in the accumulator of the processor 156 is decremented by one, although not permitted to go negative, and processor 156 turns off driver 158. Valve 160 is thereby deactivated. It is to be understood that the takeout-in signal simultaneously causes compressed air to operate actuator 112 in the takeout-in state, and that the rate of depressurization in the arm 110 and the rate of pressurization in actuator 112 are coordinated so as to cause the arm 110 to follow the path $P_5$ to $P_1$ of FIG. 5B.

In the preferred embodiment, reject logic 156 would be implemented by a mini-computer well known in the art such as, for example, a model SBC 80/05 single board computer manufactured by Intel Corporation. It is to be understood, however, that the processor 156 may comprise a plurality of well known logical components.

Figure 6:
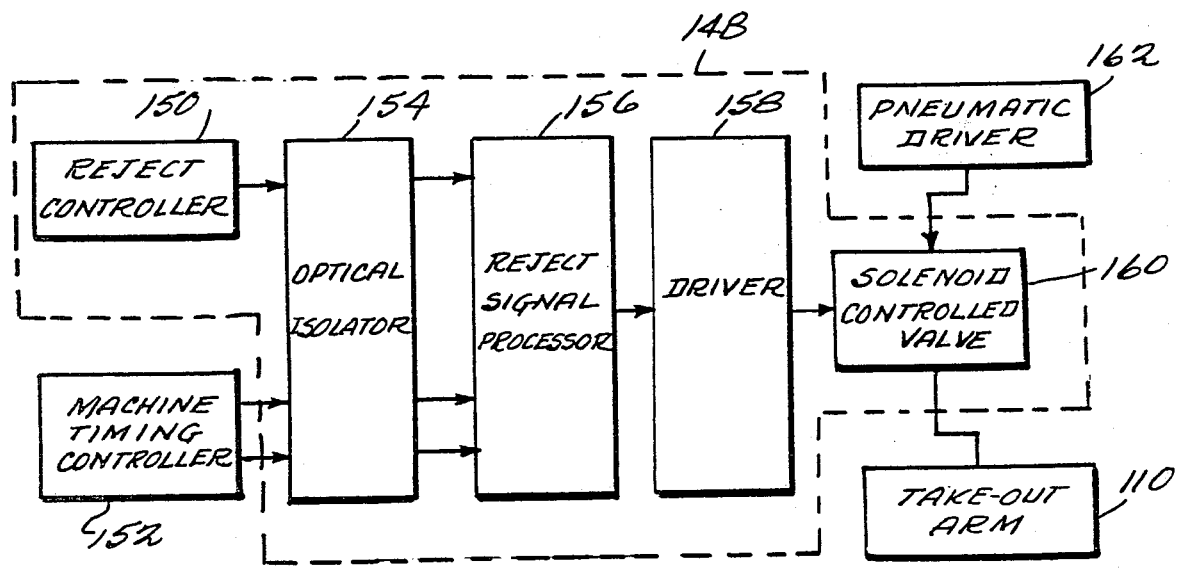
FIG. 6 is a block drawing of the control mechanism according to the present invention.
Figure 7:
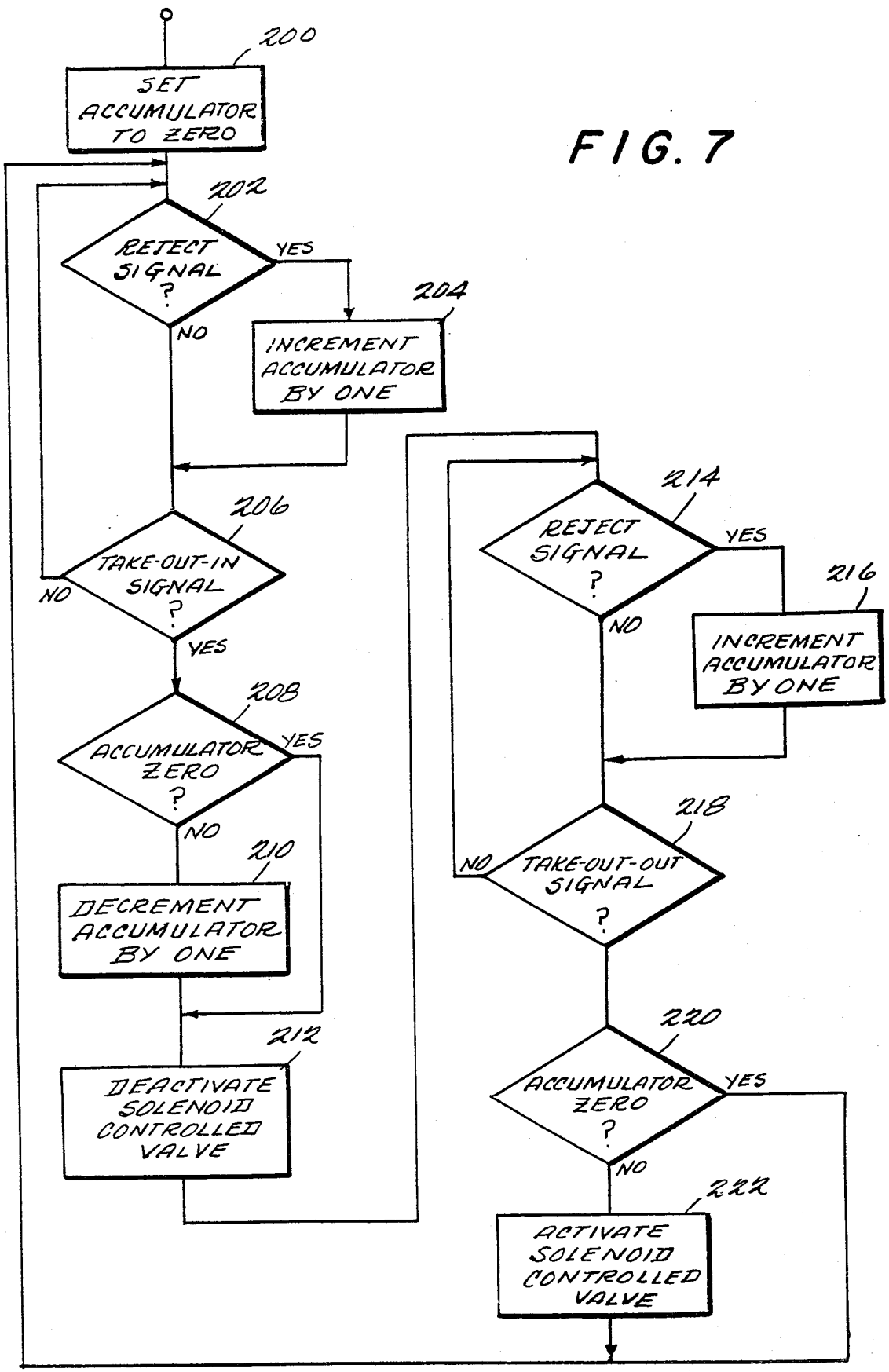
FIG. 7 is a flow chart showing the operation of the control mechanism.

FIG. 7 is a flow chart of exemplary operating steps of the controller 148 shown in FIG. 6. In the preferred embodiment, the machine timing controller 152 sequentially generates a takeout-in signal and a takeout-out signal. A reject signal may be generated by a reject controller 150 at any time. The processor 156 monitors the output of the reject controller 150 for a reject signal. When a reject signal is received, an accumulator included within the processor 156 is incremented by 1. A takeout-in signal from the machine timing controller 152 will cause the accumulator within the processor 156 to be decremented by 1 and will deactivate the solenoid controlled valve in order to retract the sections 116 of the arm 110 if they are extended. The retraction is performed synchronously with the rotation of the arm 110.

These steps are discussed in more detail with respect to FIG. 7. It is first necessary to initialize the processor 156, which requires at least setting the accumulator to zero (step 200). In the preferred embodiment a reject signal may occur at any time while a takeout-in signal will occur before a takeout-out signal. It is necessary, therefore, to test repeatedly for a reject signal, while a takeout-out signal need not be tested for until after a takeout-in signal has occurred. In the exemplary operating steps of FIG. 7, therefore, a first loop comprising a test for the occurrence of a reject signal (step 202) and a test for the occurrence of a takeout-in signal (step 206) is executed until a takeout-in signal occurs. If a reject signal occurs during the execution of the first loop, the accumulator is incremented by one (step 204) and execution of steps 202 and 206 continues.

When a takeout-in signal occurs, execution of steps 202 and 206 ceases and a test for a zero value stored in the accumulator (step 208) is executed. If the accumulator is non-zero, the accumulator will be decremented by one (step 210). Otherwise step 210 will be by-passed. Whether or not the content of the accumulator is zero, the solenoid controlled valve 160 is deactivated (step 212), regardless of whether the valve 160 is in an activated or deactivated state.

Control then passes to a second loop comprising test for the occurrence of a reject signal (step 214) and a test for the occurrence of a takeout-out signal (step 218). The second loop repeatedly tests for a reject signal and a takeout-out signal, incrementing the accumulator by one (step 216) when a reject signal occurs, and ceasing execution of steps 214 and 218 when a takeout-out signal occurs.

When a takeout-out signal occurs, a test for a zero value stored in the accumulator (step 220) is executed. If the accumulator has a non-zero value (indicating that a reject step is desired), the solenoid controlled valve 160 is activated (step 222). Step 222 is by-passed if the accumulator has a zero value. Thereafter, execution continues as described above, beginning with step 202 of the first loop.

It is to be understood that the aforementioned sequence of steps is exemplary. Variations of the sequence which test for a reject signal, either continuously or non-continuously; monitor for the occurrence of a takeout-in signal and a takeout-out signal; and respond to a detected takeout-in signal to deactivate a valve and to a takeout-out signal to activate a valve, are contemplated by the present invention.

While the invention has been described in connection with what is presently conceived to be the most practical and preferred embodiments, it is to be understood that the invention is not limited to the disclosed embodiments. There may be other embodiments, modifications, and equivalent arrangements included within the spirit and scope of the appended claims.

What is claimed is:

1. In an individual section of a machine for forming ware having molded means and cooling means for controllably cooling said ware, an apparatus for transporting ware from said molding means to a selected one of subsequent process means, including said cooling means and a disposal means, said apparatus comprising:
   a first member, operable arcuately in a predetermined plane, having first and second actuator means;
   a third actuator means for operating said first member arcuately in said predetermined plane;
   a second member movable lengthwise with respect to said first member, said first actuator means communicating with said second member and operative to extend and retract said second member with respect to said first member; and
   a head member for grasping and releasing said ware, said head member connected to said second member and responsive to said second actuator means for maintaining the axis of said ware perpendicular to a horizontal plane.

2. The apparatus of claim 1 further comprising:
   driver means for operating at least said first and third actuator means;
   valve means responsive to a control signal for applying a motive power from said driver means to said first actuator means;
   means responsive to a reject signal, a takeout-in signal, and a takeout-out signal for producing said control signal in accordance therewith, said takeout-in signal and said takeout-out signal having a predetermined relationship with one another and with the cycle of said machine; and
   a reject controller for generating said reject signal indicative of defective ware;
   wherein said predetermined plane is a vertical plane and whereby said first actuator means is responsive to said motive power to operate coordinately with said third actuator means to move said head member in an enlarging arc in said vertical plane for rejecting said ware, and responsive to the absence of said motive power to move said head member in a diminishing arc in said vertical plane for returning said head member to a ware receiving position with respect to said molding means.

3. The apparatus of claim 2 wherein said means for producing said control signal comprises:

means for incrementing a parameter by one upon receiving said reject signal and decrementing said parameter by one upon receiving said takeout-in signal when the value of said parameter is greater than zero;

means responsive to the value of said parameter and to a takeout-out signal and adapted to generate said control signal when said number is greater than zero.

4. The apparatus of claim 3 wherein said reject controller is a push-button normally-open switch.

5. The apparatus of claim 3 wherein said reject controller is a computer for obtaining a predetermined number of reject signals.

6. The apparatus of claim 3 wherein said reject controller is a sensor adapted for generating said reject signal upon sensing defective ware.

7. The apparatus as in claim 1, 2 or 4 wherein said second member comprises a plurality of interfitting telescoping elements, said first actuator adapted to extend and retract said interfitting telescoping elements with respect to one another.

8. The apparatus as in claim 1 or 2 wherein said second member comprises a toothed rack and said first actuator comprises a rack gear.

9. The apparatus as in claim 1 or 2 wherein said second member comprises a lazy tong mechanism having a series of jointed bars crossing each other, said first actuator adapted to extend and retract said lazy tong mechanism.

10. A programmable selective transfer apparatus comprising:

a cyclically operated transfer mechanism normally operative in each cycle to pick up an article from a first position and to selectively deposit that article in either a second position or a third position, said transfer mechanism including reject means which, upon actuation, automatically causes said article to be deposited in said third position instead of said second position, and control means connected to control said transfer mechanism and, in response to selective electrical signal programming inputs thereto, to automatically actuate said reject means.

11. The programmable selective transfer apparatus as in claim 10 further comprising a manually operated switch connected to said control means and providing one of said programming inputs for commanding actuation of said reject means for a desired number of successive cycles of its operation.

12. The programmable selective transfer apparatus as in claim 10 wherein said control means is adapted to be connected to a computer, said computer being capable of providing one of said programming inputs for automatically commanding actuation of said reject means for a desired number of successive cycles of its operation.

13. The programmable selective transfer apparatus as in claim 10 wherein said control means is adapted to be connected to a sensor, said sensor being capable of sensing defective ware and providing one of said programming inputs for commanding actuation of said reject means in response to sensed defective ware.

14. The programmable selective transfer apparatus as in claim 10 or 11 wherein said selective programming inputs include a signal indicative of a reject command, a signal indicative of moving said transfer mechanism into said first position, and a signal indicative of moving said transfer mechanism out from said first position, and wherein said control means comprises:

means responsive to said reject signal and said mechanism-in signal for determining a parameter indicative of the number of unexecuted reject commands;

means responsive to said mechanism-out signal and to said parameter for providing an actuation signal when said parameter has a non-zero value at the occurrence of said mechanism-out signal, and responsive to said mechanism-in signal for terminating said actuation signal at the occurrence of said mechanism-in signal; and means responsive to said actuation signal for actuating said reject means to deposit said article in said third position and for terminating actuation of said reject means to move said transfer mechanism to said first position.

15. In an individual section of a machine for molding glassware, an improved ware transfer apparatus for selectively transferring newly molded glassware (1) to a normal position for cooling and subsequent normal processing or (2) to a reject position for disposal, said ware transfer apparatus comprising:

an arm rotatable about an axis and having a ware pick-up mechanism attached thereto for picking up said ware and normally transporting it through a first arc to said normal position; and said arm including a variable length section which, upon actuation, causes said ware to be transported through a second arc to a reject position.

16. The improved ware transfer apparatus as in claim 15 further comprising control means connected to selectively actuate said variable length section for a desired number of successive cycles of operation of said transfer apparatus.

17. The improved ware transfer apparatus as in claim 16 further comprising:

a first actuator for rotating said arm; and a second actuator selectively (1) operative for causing said variable length section to increase in length for transporting said ware through said second arc and subsequently to decrease in length for rotating said pick-up mechanism through a third arc for picking up said ware; and (2) inoperative for maintaining said variable length section at a minimum length for transporting said ware through said first arc and subsequently for rotating said pick-up mechanism through said first arc for picking up said ware.

18. The improved ware transfer apparatus as in claim 17 wherein said control means comprises:

means for controllably applying pressurized fluid to and exhausting pressurized fluid from said second actuator to operate said second actuator;

means for operating said applying-exhausting means in accordance with a control signal;

means for obtaining said control signal in accordance with a first signal, a second signal, and a third signal, said first signal being indicative of commanded ware disposal operations, said second signal being indicative of commanded rotations of said arm for picking up said ware, and said third signal being indicative of commanded rotations of said arm for transferring said ware.

19. The improved ware transfer apparatus as in claim 18 wherein said means for obtaining said control signal comprises an accumulator for recording each instruction for a ware disposal operation in accordance with said first signal and for adjusting the number stored therein in accordance with each were disposal operation.

20. The improved ware transfer apparatus as in claim 19 wherein said variable length section comprises a plurality of interfitting telescoping portions.

21. An article transfer apparatus for moving an article from a first predetermined position to a selected one of a plurality of second predetermined positions, said first position and said second position defining a straight line and said apparatus operative to transfer said article in a vertical arc, said apparatus comprising:
   a rotatory actuator;
   a member adapted for grasping said article;
   an arm having a first part connected to said rotatory actuator, a second part connected to said grasping member, and a third part connecting said first part and said second part for selectively increasing and decreasing the length of said arm, said third part being controllably increased and decreased in length for rotating said article to a selected one of said second positions.

22. The article transfer apparatus as in claim 21 wherein said plurality of second positions is two, one of said second positions and said first position being the same linear distance from the axis of rotation of said arm whereby the length of said third part is maintained constant for transferring said article to said one of said second positions and for returning said arm to said first position.

23. The article transfer apparatus as in claim 22 wherein the other one of said second positions is farther from said axis than said first position whereby the length of said third part is increased for transferring said article to said other one of said second positions and decreased for returning said arm to said first position.

24. The article transfer apparatus as in claim 23 further comprising a processor for effecting the increase and the decrease in the length of said third part in response to an extension signal and a plurality of rotary control signals.

25. A method for selectively transferring articles, supplied in successive cycles of operation of a machine, to a first area for additional processing and a second area for disposal comprising the steps of:
   continuously accumulating the number of disposed operations commanded;
   grasping said article;
   rotating said article, said article being rotated one hundred eighty degrees through a first vertical arc to said first area when the result of said accumulating step is zero and being rotated one hundred eighty degrees through a second vertical arc to said second area when the result of said accumulating step is non-zero;
   releasing said article; and
   adjusting the result of said accumulating step to account for each executed disposal operation.

26. The method as in claim 25 wherein:
   said articles are newly molded glassware formed at a molding station in successive cycles of operation of a glassware forming machine;
   said accumulating step comprises the step of incrementing an accumulator by one in respect to a first signal, said first signal being a command to reject glassware molded in a successive operating cycle;
   said grasping and rotating steps are performed in response to a second signal, said second signal being a command to remove said glassware from a molding station;
   said releasing step is performed in response to the termination of said second signal; and
   said adjusting step comprises the step of decreasing the result of said accumulating step by one if the result of said accumulating step is non-zero in response to a third signal, said third signal being a command to prepare for receiving said glassware.

27. The method as in claim 26 wherein said rotating step is performed by an arm mechanism having telescoping sections, said telescoping sections being maintained in a retracted state for rotation of said glassware through said first arc and being extended in synchronism with the rotation of said arm for rotation of said glassware through said second arc, said sections being fully extended at the end of said second arc, said method further comprising the steps of:
   raising said arm a predetermined angular distance corresponding to a rotation of X degrees in response to the termination of said second signal; and
   rotating said arm to said molding station in response to said third signal, said arm being rotated one hundred eighty degrees minus X through a part of said first vertical arc when said sections are maintained in said retracted state, and through a third vertical arc when said sections are fully extended, said sections being retracted in synchronism with the rotation of said arm.

* * * * *